(12) United States Patent
Czok et al.

(10) Patent No.: US 12,462,296 B2
(45) Date of Patent: Nov. 4, 2025

(54) METHOD AND SYSTEM FOR SECURE AND AUTOMATIC MAPPING OF BLOCKCHAIN-BASED LEDGERS TO VALID ACCOUNT STATEMENTS

(71) Applicant: nupont blockchain gmbh, Berlin (DE)

(72) Inventors: Ingo Czok, Berlin (DE); Ralf Hoffmann, Berlin-Frohnau (DE)

(73) Assignee: nupont blockchain gmbh, Berlin (DE)

( * ) Notice: Subject to any disclaimer, the term of this patent is extended or adjusted under 35 U.S.C. 154(b) by 437 days.

(21) Appl. No.: 17/978,695

(22) Filed: Nov. 1, 2022

(65) Prior Publication Data
US 2024/0062283 A1 Feb. 22, 2024

(30) Foreign Application Priority Data
Aug. 16, 2022 (EP) ..................................... 22190660

(51) Int. Cl.
*G06Q 40/02* (2023.01)
(52) U.S. Cl.
CPC ......... *G06Q 40/02* (2013.01); *G06Q 2220/00* (2013.01)
(58) Field of Classification Search
CPC ............................ G06Q 40/02; G06Q 2220/00
See application file for complete search history.

(56) References Cited

U.S. PATENT DOCUMENTS

| | | | | |
|---|---|---|---|---|
| 5,710,889 A * | 1/1998 | Clark | ..................... | G06Q 30/06 705/42 |
| 11,025,409 B1 * | 6/2021 | Fields | ....................... | H04L 9/30 |

(Continued)

OTHER PUBLICATIONS

"Significant Figures." Retrieved from <https://en.wikipedia.org/w/index.php?title=Significant_figures&oldid=1035494140>. Originally published Jul. 2021. (Year: 2021).*

(Continued)

*Primary Examiner* — Nathan A Mitchell
(74) *Attorney, Agent, or Firm* — David R. Stevens; Stevens Law Group

(57) ABSTRACT

A computer-implemented method for generating account statements for a user from blockchain data is disclosed, the method comprising the following steps performed by a communication server: providing a connection between the communication server and a blockchain network; retrieving data associated with the account address of the user from a block most recently generated on the blockchain network, including a final account state, wherein the final account state comprises a final account balance of the block corresponding to the account address of the user; determining whether the final account state of the block differs from an account state of the user that was last stored in a memory accessible by the communication server, and if a difference is determined: storing the final account state as account state of the user in the memory; retrieving further data associated with the account address of the user from the block including blockchain transactions; deriving a closing balance from the final account balance comprising converting the closing balance into an account statement format; converting information in the blockchain transactions into transaction data, wherein the transaction data have the account statement format; generating, for the account address, a current account statement comprising the closing balance and the transaction data; and holding the current account statement available for the user.

15 Claims, 5 Drawing Sheets

(56) References Cited

U.S. PATENT DOCUMENTS

| | | | |
|---|---|---|---|
| 2018/0101914 A1 | 4/2018 | Samuel | |
| 2019/0079998 A1* | 3/2019 | Rush | H04L 9/0643 |
| 2019/0188787 A1* | 6/2019 | Besanson Tuma | H04L 9/0637 |
| 2020/0027169 A1* | 1/2020 | Valencia | H04L 9/3231 |
| 2020/0184479 A1* | 6/2020 | Benkreira | G06Q 20/0658 |
| 2020/0285637 A1* | 9/2020 | Bandyopadhyay | H04L 9/50 |
| 2020/0311811 A1* | 10/2020 | Snyder | G06Q 20/0655 |
| 2020/0364183 A1* | 11/2020 | Zhou | G06Q 20/065 |
| 2021/0144149 A1* | 5/2021 | Simons | H04L 63/12 |
| 2021/0326484 A1* | 10/2021 | Zeng | G06F 21/64 |
| 2022/0012729 A1* | 1/2022 | Hu | G06Q 20/363 |
| 2022/0030031 A1* | 1/2022 | Kocsis | H04L 9/3297 |
| 2022/0101326 A1* | 3/2022 | Kim | G06Q 20/4016 |
| 2023/0318856 A1* | 10/2023 | Seki | G06Q 20/3678 |
| | | | 713/189 |

OTHER PUBLICATIONS

McCallig, John, Alastair Robb, and Fiona Rohde. "Establishing the representational faithfulness of financial accounting information using multiparty security, network analysis and a blockchain." International Journal of Accounting Information Systems 33 (2019): 47-58. (Year: 2019).*

Wood Gavin et al: "Ethereum: a Secure Decentralised Generalised Transaction Ledger", EIP-150 Revision, Apr. 12, 2017 (Apr. 12, 2017), pp. 1-32, XP055574008, Retrieved from the Internet: URL:https://ethereum.github.io/yellowpaper/paper.pdf, retrieved on Mar. 25, 2019.

* cited by examiner

METHOD AND SYSTEM FOR SECURE AND AUTOMATIC MAPPING OF BLOCKCHAIN-BASED LEDGERS TO VALID ACCOUNT STATEMENTS

CROSS-REFERENCE TO RELATED APPLICATION

This application claims the benefit of European Application Serial No. 22190660.5, filed Aug. 16, 2022, which is hereby incorporated herein by reference in its entirety.

TECHNICAL FIELD

The present disclosure is related to systems and methods for securely and automatically mapping blockchain-based balances and transactions of all types into a valid, accurate, and complete account statement in near real-time.

BACKGROUND

For fiat currencies, there are well-established procedures for the electronic retrieval of account statements from bank ledgers and their subsequent processing at a company. An account statement is a compliant, accurate, complete and chronological summary of financial transactions occurring within a given period of time for each bank account held by a business with a financial institution. Typically, corporates interact with a corporate payment server to initiate the retrieval of the account statements. The corporate payment server communicates with a bank communication server of a bank ledger via an electronic banking communication server of a bank ledger via an electronic banking communication network.

The protocols used for interacting between those servers are, for example, EBICS, sFTP, or any other established bank communication protocol. Companies import the account statements over the electronic banking communication network into their internal accounting systems (ERP or TMS) in a continuous, automated process. They can then automatically reconcile the account statement postings with the internal postings or add new ones based on the imported account statements.

In such traditional finance systems connected to fiat banks, account statements are delivered, e.g. once per day usually in the morning hours to produce an up-to-date picture on the company's liquidity at the bank account in question as soon as the users start working. During the day, when new transactions are made, customer statement messages might be submitted from the banks to the clients to get an update on the liquidity situation during the day.

SUMMARY

The present disclosure provides systems, methods, communication servers, computer programs, and non-transitory computer-readable storage mediums for securely and automatically mapping blockchain-based balances and transactions of all types into a valid, accurate, and complete account statement in near real-time.

The computer-implemented method disclosed is for generating account statements from blockchain data, the method comprising the following steps: providing a secure connection between a communication server and multiple nodes on a blockchain network; monitoring the blockchain network in real-time to retrieve every new block and filter for relevant states and transaction in a highly efficient manner; identifying internal transactions not explicitly recorded on the blockchain through virtual machine execution tracing methodologies to form a valid account statement, where the opening balance plus the sum of all transactions equals to the closing balance and providing this validated account statement to payment servers in the established file formats and protocols that banks use for the communication with their clients.

With blockchain-based ledgers transaction initiation and their booking on the blockchain ledger happen in a comparable short timeframe (e.g. within seconds). For cash management users it is key to have an insight into the transactions as they happen, preferably near real-time.

However, corporates that perform blockchain transactions with cryptocurrencies are also required to create valid account statements to meet the regulatory and (internal) corporate governance requirements. Blockchain networks and service providers do not offer such statements.

Therefore, corporates would be hindered to perform blockchain transactions or are forced to analyze any single transaction and manually create excerpts on a "transaction by transaction" basis, if even possible, which is time-consuming and bearing the risk of being inaccurate and incomplete.

Hence, there is a need for a technical solution where blockchain ledger-based balances and all kinds of transactions can be securely mapped into a valid, accurate, and complete account statement in near real-time.

The underlying problem addressed by the present disclosure can therefore be regarded as how to enable the existing internal corporate account systems to also automatically process blockchain ledger-based balances and transactions in near real-time without requiring modifications of the existing corporate account systems and the Corporate Payment Server.

According to the disclosure, said problem is solved by a method, system, communication server, computer program, and non-transitory computer readable storage medium according to a method as claimed in claim 1, a communication server as claimed in claim 11, a system as claimed in claim 13, a computer program as claimed in claim 14, and a non-transitory computer readable storage medium as claimed in claim 15.

A summary of various aspects of the present disclosure is hereinafter presented to provide a basic understanding of these aspects and their associated advantages. Further aspects and technical details are covered in the subsequent chapter entitled "detailed description".

The present disclosure is directed to provide a method for securely and automatically mapping blockchain-based ledgers to valid account statements in near real-time that can be further processed by corporate users based on their already existing financial systems. Furthermore, the disclosure aims at providing a communication server, a system, a computer program, and a non-transitory computer readable medium for providing a secure and automatic mapping of blockchain-based ledgers to valid account statements.

According to one aspect, a computer-implemented method for generating account statements for a user from blockchain data, the method comprising the following steps performed by a communication server: providing a connection between the communication server and a blockchain network; retrieving data associated with the account address of the user from a block most recently generated on the blockchain network, including a final account state, wherein the final account state comprises a final account balance of the block corresponding to the account address of the user;

determining whether the final account state of the block differs from an account state of the user that was last stored in a memory accessible by the communication server, and if a difference is determined: storing the final account state as account state of the user in the memory; retrieving further data associated with the account address of the user from the block including blockchain transactions; deriving a closing balance from the final account balance comprising converting the closing balance into an account statement format; converting information in the blockchain transactions into transaction data, wherein the transaction data have the account statement format; generating, for the account address, a current account statement comprising the closing balance and the transaction data; and holding the current account statement available for the user.

The method enables corporates to automatically integrate blockchain-based balances and transactions into their existing financial system without needing modifications of the server on the corporate side and the established banking communication network. The method continuously monitors the blockchain securely and in near real-time to identify new value changes on corporate user accounts by inspection of all new blocks arriving on the blockchain nodes. The new blocks are processed to account statements in the form of a valid account statement format and transported to the corporate payment server of the users as customer statement messages. Given that in the first step, only the final state of each newly created block is analyzed, and further data is only retrieved if a change in the account state is detected, a very efficient monitoring of the blockchain is achieved and near real-time processing is enabled, which is a key to having insight into the transactions as they happen.

According to another aspect, the data and/or the further data may be retrieved from the blockchain network by performing the steps of: connecting to at least a first blockchain node server and a second blockchain node server; retrieving first data of the block from the first blockchain node server and second data of the block from the second blockchain node server, wherein the first and second data each comprise the final account state and/or the blockchain transactions; and checking whether the first data and the second data are identical, and if identical continuing with further processing of the data and/or the further data, and if not identical raising an error condition.

This enhances security and reliability of the data retrieved. The system can detect tampered nodes by comparing the results of blocks supplied by different nodes and alerting users when tampering is detected. In addition to the avoidance of bogus Blockchain Node Server, robustness and fault-tolerance is added to the architecture. If e.g. one of the blockchain node servers cannot be reached, at least the other one can still provide valid information.

According to still another aspect, each transaction of the blockchain transactions may comprise the account address, a transaction amount and a target account address to which the transaction amount is transmitted; and wherein the current account statement may further comprise an opening balance that is equal to a last stored account balance of the last stored account state.

According to yet another aspect, the retrieving of data may be triggered each time a new block is generated on the blockchain network.

This enables a near real-time monitoring of the blockchain and of statement creation.

According to a further aspect, the computer-implemented method may further comprise the steps of: transforming the current account statement into another account statement format; and sending a message comprising the transformed account statement to a corporate payment server via a communication network.

This ensures that the generated blockchain-based account statement complies with regulatory and (internal) corporate governance requirements.

According to another aspect, the blockchain may be based on an Ethereum Virtual Machine, EVM, and the method may further comprise the step of: determining internal transactions from smart contract executions, by tracing executions of the smart contract and for each execution of a smart contract opcode comparing a before and after status.

Blockchains based on the Ethereum Virtual Machine (EVM) not only allow for the transfer of native cryptocurrencies or tokens from one externally owned account to another but also for executing program code contained in contract accounts, called "Smart Contracts." Internal transactions result from the execution of smart contracts of an EVM-based blockchain. However, transactions of the smart contracts are not stored separately on the blockchain but are part of the state transitions. A valid account statement has to include all transactions, also internal ones. Through rigorous tracing of state changes on every opcode on the virtual machine during smart contract execution, the internal transactions of the smart contract executions are determined. The internal transactions are then used to generate valid account statements.

According to another aspect, the at least first and second blockchain node servers can be tracing blockchain node servers.

According to another aspect, the internal transactions may be determined by performing the following steps: determining first internal transactions from the smart contract executions, by tracing the executions of the smart contract on a first tracing blockchain node server; determining second internal transactions from the smart contract executions, by tracing the executions of the smart contract on a second tracing blockchain node server; and checking whether the first internal transactions and the second internal transactions are identical, and if identical continuing with further processing of the internal transactions, and if not identical raising an error condition.

Determining the internal transactions by tracing executions of smart contracts on multiple tracing blockchain node servers and comparing the results to each other ensures fault tolerance and provides further confidence that the data is correct.

According to another aspect, the transaction data may include the internal transactions According to a further aspect, the account statement can be generated for a specified time range.

According to another aspect, a communication server for generating account statements from blockchain data, is configured to perform the steps of: providing a connection between the communication server and a blockchain network; retrieving data associated with the account address of the user from a block most recently generated on the blockchain network, including a final account state, wherein the final account state comprises a final account balance of the block corresponding to the account address of the user; determining whether the final account state of the block differs from an account state of the user that was last stored in a memory accessible by the communication server, and if a difference is determined: storing the final account state as account state of the user in the memory; retrieving further data associated with the account address of the user from the block including blockchain transactions; deriving a closing balance from the final account balance comprising converting the closing balance into an account statement format; converting information in the blockchain transactions into transaction data, wherein the transaction data have the account statement format; generating, for the account address, a current account statement comprising the closing balance and the transaction data; and holding the current account statement available for the user.

According to another aspect, the communication server may be further configured to perform any of the method steps previously mentioned.

According to another aspect, a system for generating account statements from blockchain data comprises the communication server previously mentioned and the blockchain network.

According to another aspect, a computer program comprises instructions that, when executed by one or more processors, cause the one or more processors to perform the steps of any of the method steps previously mentioned.

According to another aspect, a non-transitory computer readable medium stores instructions that, when executed by one or more processors, cause the one or more processors to perform the steps of any of the method steps previously mentioned.

BRIEF DESCRIPTION OF THE DRAWINGS

The foregoing summary and the following detailed description of preferred embodiments will be more readily understood if read in conjunction with the accompanying drawings. To illustrate the invention, the drawings show exemplary details of the embodiments described. The information shown in the drawings is exemplary and explanatory only and does not limit the claimed invention.

The present invention is described in detail below with reference to the accompanying drawing.

DETAILED DESCRIPTION

In a standard banking system, the state is a balance sheet, a transaction is a request to move X from A to B, and the state transition function reduces the value in A's account by X and increases the value in B's account by X.

An account statement is used by banks to provide the customer with up-to-date information on the transactions happening on their accounts and the resulting new balances that these transactions lead to.

Figures 1, 2:
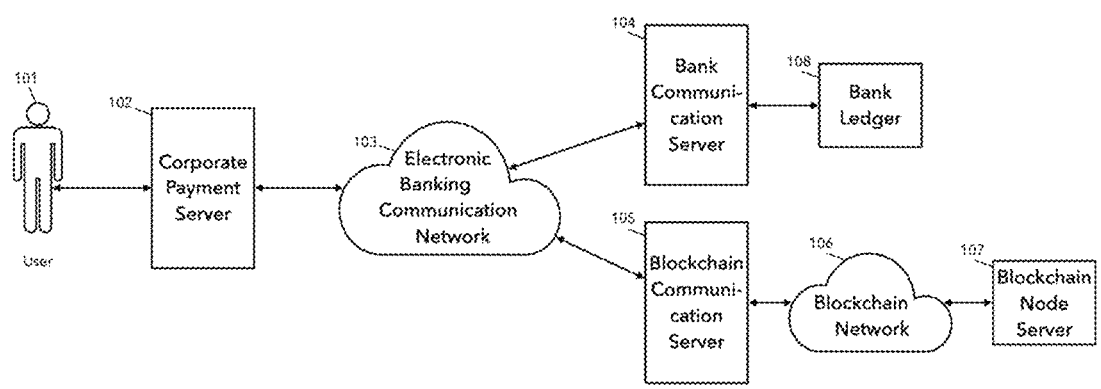
FIG. 1 shows an example of a valid electronic account statement.
FIG. 2 illustrates an exemplary system for the creation and the transport of valid account statements according to one embodiment of the present disclosure.

Diagram 300 in FIG. 1 shows a symbolic and simplified example of an Electronic Account Statement 301, which will be used below to describe the individual components of such a statement. The actual electronic account statements are defined in the message format specifications and are much more extensive. The EBICS standard ("Electronic Banking Internet Communication Standard") and the underlying data formats camt.052/camt.053 and MT940/MT942 are documented at ebics.org. The BTRS standard is maintained by X9 and the international camt.052/camt.053 messages can be found in the ISO 20022 Message Definitions in the Bank-to-Customer Cash Management section.

In the exemplary account statement depicted in FIG. 1, only the essential entities are included. For better comprehensibility, the illustration is structured like a natural account statement, this is obviously not the case in the native electronic versions mentioned above.

Each account statement 301 contains a header 302 as well as a body 303. The header 302 contains at least the account number, owner, currency, the statement number as well as the statement date, which is the statement of the creation of this account statement.

The body 303 includes an opening balance 304 that describes the account balance before the transactions 305 are processed. The transactions 305 are the individual bookings on the account that fall into the categories "Credit" 307 and "Debit" 308. The total amount of all credit 307 transactions is added to the opening balance and the total amount of all debit 308 transactions is deducted from the opening balance resulting in the closing balance 306. Each transaction at least includes the following details in addition to the credit 307 and debit 308 amounts: a bookdate 310 that defines the date on which the transaction has been booked in the general ledger of the bank, a No. 309 that uniquely identifies the transaction among the set of transactions 305 within this account statement 301 and an optional purpose 311 that may contain additional textual information for the account holder to identify the transaction.

In an actual electronic account statement, there are many more entities like value dates and value balances, the beneficiary identification, the type of booking (single or collective), fees, deviating currencies, their exchange rates and the equivalent value in account currency etc.

An account statement has to abide by certain constraints to be considered valid. One of those constraints is that the opening balance 304 plus the sum of all credit values 307 of the transactions 305 minus the sum of all debit values 308 of the transactions 305 is equal to the closing balance 306. Another constraint is that the closing balance 306 of one statement 301 is the opening balance 304 of the next sequential statement 301 with a statement number incremented by one.

As shown further below, blockchain-based transaction systems are built differently from the traditional banking systems and do not natively produce valid account statements as described above.

Corporates that perform blockchain transactions with cryptocurrencies are required to create valid account statements to meet regulatory and (internal) corporate governance requirements. Blockchain networks and service providers do not offer such statements.

Therefore, corporates would be hindered from performing blockchain transactions or are forced to analyze any single transaction and manually create excerpts on a "transaction by transaction" basis, if even possible, which is time-consuming and bears the risk of being inaccurate and incomplete.

Hence, there is a need for a technical solution where blockchain ledger-based balances and all kinds of transactions can be securely mapped into a valid, accurate, and complete account statement.

FIG. 2 illustrates one embodiment of a system 100 for the creation and the transport of valid account statements from both blockchain-based distributed ledgers as well as traditional bank ledgers to be further processed by traditional finance software at corporates.

User 101 interacts with corporate payment server 102 to initiate the retrieval of account statements. The user 101 is an individual or a legal entity that uses the system or service. The user 101 has an IT user account. The user's IT account allows a user to authenticate to a system and potentially to receive authorization to access resources provided by or connected to that system; however, authentication does not imply authorization. To log into an IT account, a user is typically required to authenticate oneself with a password or other credentials for the purposes of accounting, security, logging, and resource management.

The corporate payment server 102 communicates with at least one bank ledger 108 that uses a bank communication server 104 and communicates with at least one blockchain network 106 consisting of at least one blockchain node server 107.

The electronic banking communication network 103 that the corporate payment server 102 uses for communicating with the bank communication server 104 and a blockchain communication server 105 is identical for both communication servers 104 and 105. Also, the protocols used for interacting between those servers are identical. It could be EBICS, sFTP, sometimes called "Host-to-Host" in the finance industry, or any other established Bank Communication Protocol. This enables immediate secure access to blockchain networks 106 without technical modifications on the corporate payment server 102 and electronic banking communication network 103.

The blockchain network 106 contains at least one—but in most cases, many—blockchain node server 107. The blockchain node server 107 stores identical copies of the blockchain, and the consensus algorithm of the blockchain is used to synchronize valid nodes. A blockchain node server 107 is a single instance of a blockchain server that replicates all states and transactions within a blockchain. It interconnects with peers in a blockchain network to reach consensus on the correct states and transactions via the consensus algorithm. The blockchain is used to store state transitions. The key point is that blockchains store transactions and balances differently than traditional banking ledgers or even not at all. Therefore, a technically sophisticated retrieval and transformation engine is required for the blockchain ledger to be considered valid by the existing corporate payment server 102 and the user's accounting systems. At the same time, this engine must be highly secure, fault-tolerant, and capable of near real-time intraday processing to be considered robust enough for production environments.

From a technical standpoint, the ledger of a cryptocurrency can be thought of as a state transition system, where there is a "state" consisting of the ownership status of all existing cryptos and a "state transition function" that takes a state and a transaction and outputs a new state which is the result.

The blockchain account state is the state of a block on the blockchain corresponding to a single user account address. Each user has a corresponding account address that is associated with the blockchain account state. The user may have multiple account addresses each corresponding to one blockchain account state.

In Ethereum e.g., the blockchain account state is called account state and comprises the following fields:
nonce—Number of transactions sent from this address (if this is an External
Owned Account—EOA) or the number of contract creations made by this account
balance—Total Ether (in Wei) owned by this account
storageRoot—Hash of the root node of the account storage trie
codeHash—For contract accounts, the hash of the EVM code of this account. For EOAs, this will be empty.

In Solana the blockchain account state is called "Accounts". Accounts contain metadata like who is allowed to access the data and how. Solana accounts are rented. Here's a breakdown of the account data:
Public Key—the public key assigned to this account
Balance—the amount of SOL owned by this account
Owner—The address of the program that has ownership of this account
Executable—If this is an executable account or not
rent epoch—The next epoch in which this account will pay rent
Length—The size of the account The blockchain communication server 105, also called communication server in this disclosure, is a technical infrastructure component and the core of this disclosure that actively connects to at least one blockchain node server 107 to acquire and reverse engineer information about the stored transactions and states of the blockchain in order to send a valid account statement message back to the corporate payment server through the electronic banking communication network 103. The blockchain communication server 105 is the receiving server that supports the common protocols like EBICS or sFTP for the users to upload payments or download account statements amongst others. The blockchain communication server 105 connects to one or several blockchain networks and extracts states and transactions or initiates transactions based on the payment instructions received from the users.

The following sections detail how exactly the blockchain communication server 105 can provide this technical connectivity in a secure, efficient, validated, and near real-time manner.

The account statements returned to the corporate payment server 102 and ultimately the user 101 need to be correct and complete under all circumstances. This is not only because of regulatory requirements but also because valuable business decisions depend on trustworthy account statements. The present disclosure provides a mechanism for ensuring the validity of the retrieved information from the blockchain node server 107, wherein the system 100 achieves a significant security level as a whole.

The technical details of the core components of the blockchain communication server 105 are elaborated further in the following sections.

Figure 3:
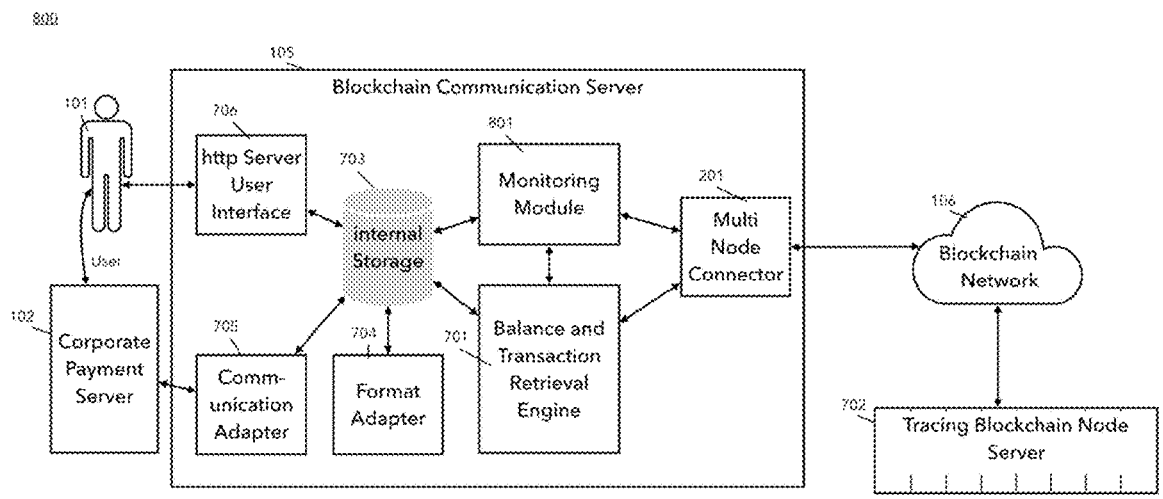
FIG. 3 shows an embodiment of the blockchain communication server.

Diagram 800 in FIG. 3 shows a blockchain communication server 105 according to one embodiment of the present disclosure. The blockchain communication server 105 comprises a monitoring module 801 that constantly monitors the creation of new blocks over a connection through the blockchain network 106 to a blockchain node 702, wherein the blockchain node 702 may also be a tracing blockchain node. For further security measures, as explained in the context of FIG. 6 and FIG. 7, the monitoring module 801 may constantly monitor the creation of new blocks over at least two connections through the blockchain network 106 to at least two blockchain nodes 702 of the blockchain network, wherein the at least two blockchain nodes 702 may also be tracing blockchain nodes. If a new block is received, the monitoring module 801 will examine the states of all monitored account addresses that user 101 has administrated using the http server user interface 706 and stored in the internal storage 703. If the information in an account state of at least one monitored account address changes with the new block, the balance and transaction retrieval engine 701 is triggered to retrieve all relevant blockchain transactions corresponding to the account address (this is detailed further in the context of FIG. 8 to FIG. 11). This may also comprise internal value transfers of smart contracts (see the explanation of "internal transactions" further below) to immediately provide a customer statement message in the corresponding account statement formats MT942, camt.052, or comparable with the Format Adapter 704 and then deliver that account statement via the communication adapter 705 back to the corporate payment server 102 and ultimately the user 101.

Figure 4:
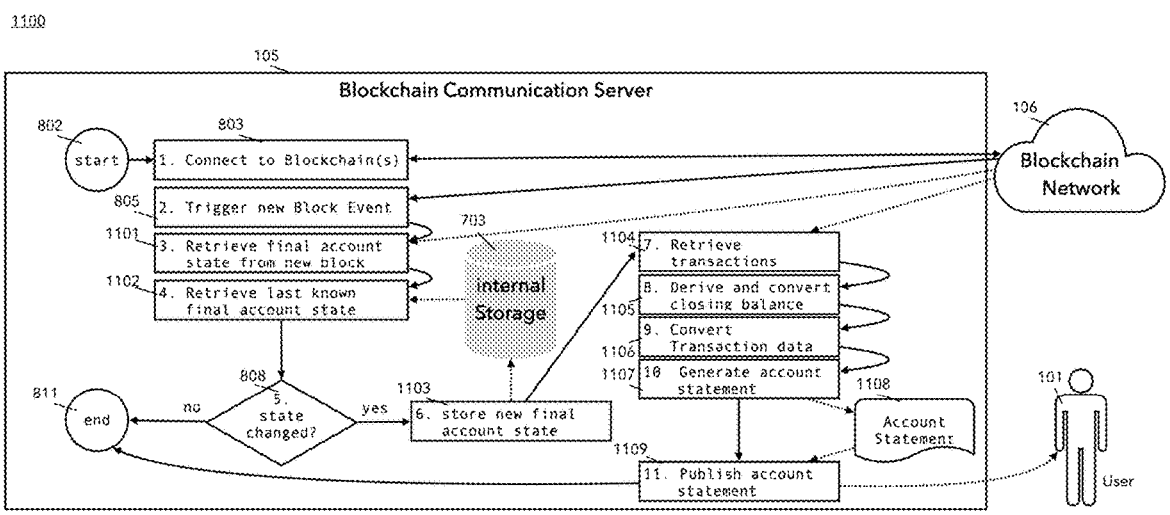
FIG. 4 shows an embodiment of a flow chart of generating an account statement by the blockchain communication server.

Diagram 1100 in FIG. 4 shows a flowchart of the monitoring module 801 of the blockchain communication server 105 according to one embodiment of the present disclosure. The steps of the flowchart are described in the following in detail. The communication server 105 performs the following steps for generating a current account statement for a user in near real-time:

Upon starting in step 802, step 803 proceeds in setting up a connection between the communication server 105 and a blockchain network 106. Several blockchain networks can be used, such as Ethereum, Polygon or Solana. The communication server 105 may establish a connection to multiple blockchain networks 106.

Upon reception of a new block event in step 805, the communication server continues with the following method steps of analyzing and processing blockchain data. The new block event is triggered each time a new block is generated on the blockchain network or one of the multiple blockchain networks.

At step 1101 data associated with the account address of the user are retrieved from the block most recently generated on the blockchain network, including a final account state, wherein the final account state comprises a final account balance of the block corresponding to the account address of the user.

Each block of a blockchain contains 1 to n blockchain transactions describing a state transition. For every transaction there is a new state resulting from the transaction. The final state is the state following the last transaction in a block. The blockchain final account state is a state or state information corresponding to a specific account address within the final state. It comprises amongst others the closing balance of this account address in the context of the current block and may comprise further data depending on the type of blockchain network to which the connection is established.

At step 1102 a last known final account state is retrieved from the memory, wherein the memory is the internal storage 703 or any other external storage accessible by the communication server, and wherein the last known final account state is the account state that was last stored in the storage.

In step 808 it is determined whether the final account state of the block differs from the account state of the user that was last stored in the memory. A difference is determined by comparing the information contained in the final account state and the information contained in the account state that was stored in memory in the previous iteration. If a difference is not determined, further processing of the block data is terminated 811.

If a difference is present, the method proceeds with step 1103, wherein the final account state of the block is stored as account state of the user in the memory. This makes the final account state of the block the account state in the next iteration, when the retrieval of data of the next block is triggered.

In step 1104 further data associated with the account address of the user is retrieved from the block including blockchain transactions. Depending on the type of blockchain network the blockchain transactions comprise different information as described in the following sections. The information includes, amongst others, the account address of the user, a transaction amount and a target account address of a target user.

The method continues with step 1105, where a closing balance is derived from the final account balance. The deriving comprises converting the closing balance into an account statement format including rounding the final account balance value to suitable decimal places according to specific crypto currency and cutting to 18 numeric characters altogether. In the unlikely event that the original blockchain value has a value that exceeds the number of pre decimal places of the target format an error condition is raised.

An example of such a conversion is shown in the following based on Ethereum. On Ethereum e.g. amounts are represented as unsigned integers with a bit length of 256. A fixed number of decimal places (in the 10 system) of 18 digits is assumed. This would mean that amounts in Ethereum can have a maximum of 60 digits before the decimal point and 18 digits after the decimal point. The camt.053 XSD specification allows the representation of a total of 18 digits including 5 decimal places. Amounts must therefore be rounded in some way. For Ether with a current exchange rate of about €1,500, the best option is rounding to 5 decimal places. Although thereby representation losses with the fees can occur, the pre-decimal places of e.g. the camt.053 are sufficient for all conceivable business. Consideration of the possibility of using a different unit with a shifted decimal point led to the conclusion that rounding to five decimal places is the best compromise.

This procedure also depends on the exchange rate ratio for each currency, since in the downstream ERP systems the amounts are often converted and displayed in the local currency EUR, USD or e.g. GBP.

The account statement format is, e.g., one of the formats as described in the context of FIG. 1 as for example camt.052/camt.053 and MT940/MT942.

The method continues with a converting step 1106 in which information in the blockchain transactions is converted into transaction data, wherein the transaction data have the account statement format. This may comprise converting the transaction amount of each blockchain transaction in a manner analogous to the final account balance described above.

The following step comprises generating 1107, for the account address of the user, a current account statement 1108, which comprises the closing balance and the transaction data in the account statement format defined. The account statement may also comprise an opening balance. The opening balance is equal to the last stored account balance of the last stored account state that was stored in memory in the previous iteration of data retrieval from the blockchain. The equation $s=a+\Sigma T$ applies to valid account statements. Where "s" is the closing balance, "a" is the opening balance, and T is the set of relevant transactions "t" and their amount.

The final step comprises holding 1109 the current account statement available for the user and finalizing 811 the iteration. This may include sending or providing the statement to the user or storing it on a memory accessible by the user and/or the blockchain communication server. The current account statement may be provided by incorporating it into a customer statement message.

Figure 6:
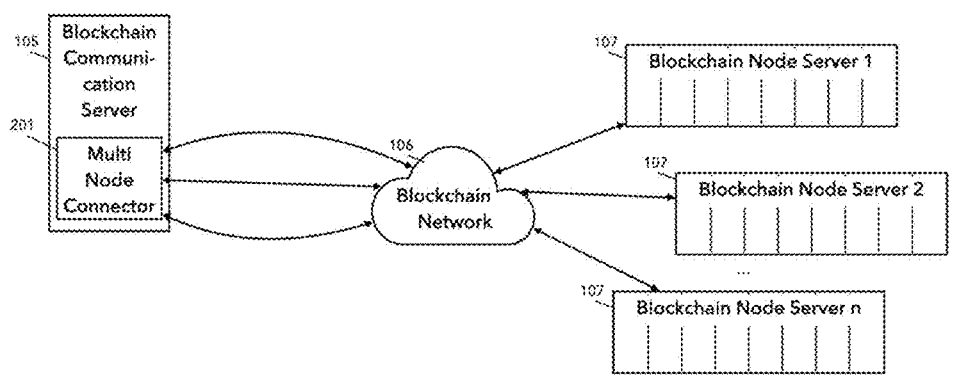
FIG. 6 shows one embodiment of a multi node connector of the blockchain communication server.
Figure 7:
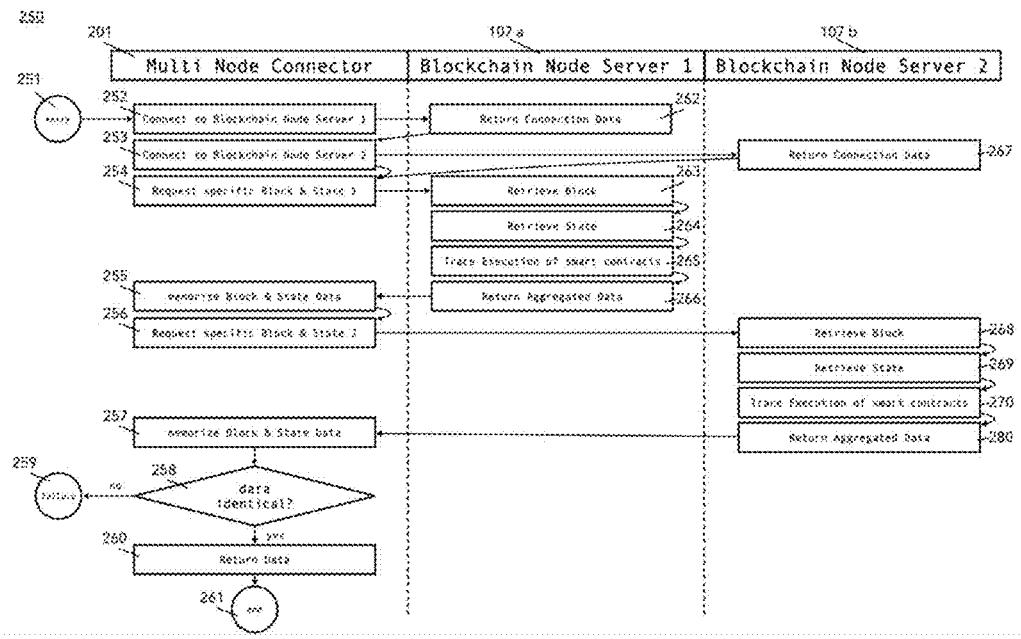
FIG. 7 illustrates one embodiment of a flow chart of the multi node connector.

In one embodiment the retrieval of data like blocks, states and/or transactions from the blockchain network comprises connecting to at least two blockchain node servers via the multi node connector of the blockchain communication server and performing the steps as described in the context of FIG. 6 and FIG. 7.

In a further embodiment, the retrieving of further data from the blockchain comprises determining internal blockchain transactions from smart contract executions. This comprises the steps as described in the context of FIG. 8 to FIG. 11. In that case the blockchain node server is a tracing blockchain node server. Similar to the retrieval of external blockchain transactions, the retrieval of internal blockchain transactions can be performed on at least two blockchain node servers, for security enhancement, via the multi node connector of the blockchain communication server as described previously. The data on the account statement has to fulfill the following formula $s=a+\Sigma Te+\Sigma Ti$, where Te references the external transactions and Ti references the internal transactions.

In further embodiment, the method may further comprise converting the account statement into another account statement format by means of the format adapter 704 and sending the account statement as message or customer statement message to the user.

Figure 5:
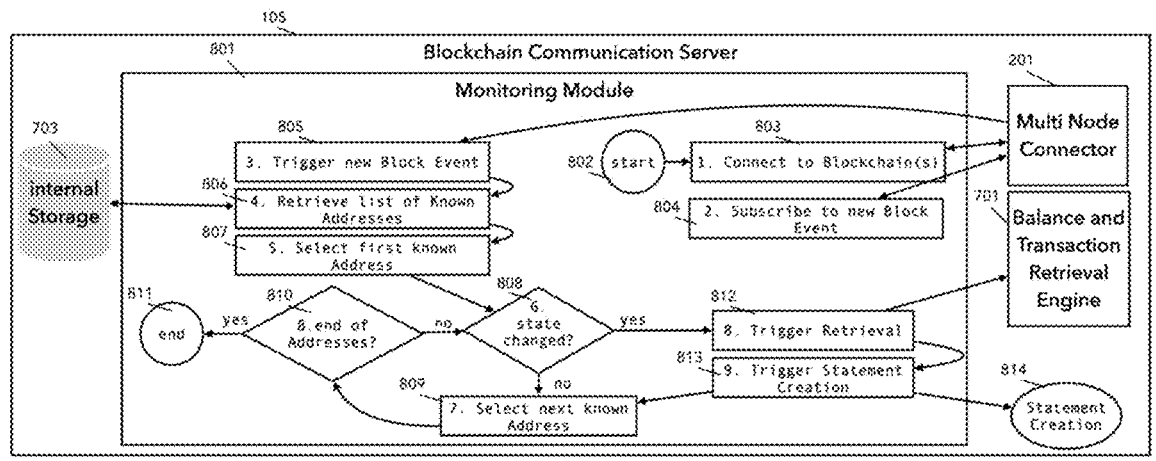
FIG. 5 illustrates another embodiment of a flow chart of generating an account statement by the monitoring module of the blockchain communication server.

In another embodiment shown in FIG. 5, the blockchain communication server 105 performs the following steps for generating current account statements for multiple account addresses.

Upon the start of monitoring module 801, which is part of the blockchain communication server 105 as shown in diagram 800 of FIG. 3, a sockets-based connection to the multi node connector 201 is established in step 1 (803). Then the monitoring module 801 subscribes to the event "new Block" 804 to be informed about each new block added to the blockchain. The multi node connector 201 handles the intrinsic in setting up this subscription with a blockchain node server 107. The multi node connector 201 is optional as the communication server 105 may also connect to only one blockchain server node. The multi node connector 201 establishes a connection with at least two blockchain server nodes via the blockchain network 106. As soon as the event triggers, the multi node connector 201 will make sure that only identical blocks will be delivered as a single event to the monitoring module 801. Step 3 (805) that consumes the event will receive the contents of the new block, that is, the final account state associated with the account address of the user, and store it, including the final account balance information from that block's final account state in memory (internal or external storage). In step 4 (806), a list of known account addresses and last known or last stored account states corresponding to each of the account addresses is retrieved from the internal storage 703. The storage on which the addresses and account states are stored is not necessarily an internal storage of the blockchain communication server but it has to be accessible by the blockchain communication server. This list was initially set up by users 101 of the system on the http server user interface 706 with accounts and account addresses that should be monitored. Typically these are the accounts and account addresses externally owned by the users themselves. Now the first known account address in this address list is selected in step 5 (807). In Step 6 (808), the information contained in the account state corresponding to the first known account address stored in the known addresses list is compared to the information contained in the new account states received from the most current block. In the event that the state of this particular account address has changed, the retrieval of all blockchain transactions and any other value transfers is triggered by the invocation of the balance and transaction retrieval engine 701 as described further below. Once the relevant transaction information has been aggregated and converted into an account statement format, a valid account statement can be immediately generated for this account address as a customer statement message using step 9 (813), which invokes the account statement generation and finally the provisioning via the electronic banking communication network 103 to the corporate payment server 102 of the user 101. Execution continues with step 7 (809) as described below after triggering statement creation 814.

If the account state in step 6 (808) has not changed compared to the previous state, the next known address is selected in step 7 (809) from the list. If there are no other addresses to be assessed, the process is terminated with state 811 "end." Otherwise, the execution is continued again with step 6 (808), see above.

Through the consensus algorithm of the blockchain network 106, it is ensured that only blockchain node servers 107 that have correctly replicated the blockchain blocks and executed the contained program steps that may be included in so-called "smart contracts" are included in validated blocks that application programs could retrieve via the blockchain node servers' application programming interface (API). However, a bogus network or node could still deliver manipulated blocks via its API but nevertheless be compliant with the consensus algorithm.

Therefore, the multi node connector 201 according to one embodiment of the present disclosure, as depicted in diagram 200 of FIG. 6, may be implemented within the blockchain communication server 105 that communicates with at least two arbitrary blockchain node servers 107 and retrieves the same block and state information from different instances of the same blockchain network 106. The blockchain communication server 105 or monitoring module 801 instructs the multi node connector 201 to retrieve the required information, e.g. the account states or blockchain transactions. The multi node connector 201 connects securely to at least two blockchain node servers 107 and retrieves the requested information from the respective block and state data stored on all connected blockchain node servers 107 simultaneously. Only if the information retrieved from all the blockchain node servers 107 is identical the information is passed on to the blockchain communication server 105 for further processing, including the creation of valid account statements based on the retrieved information detailed further below. Should the information retrieved from the blockchain node servers 107 be not identical, the multi node connector 201 raises an error condition to the blockchain communication server 105 and aborts the retrieval of information. This error condition may be communicated to the corporate payment server 102, which displays a corresponding error message back to user 101. This may also be delivered via push notification or other forms of immediate and/or asynchronous communication methods like email or short message service.

The multi node connector 201 is also utilized in a scenario where multiple blockchain node servers are used to monitor the arrival of new blocks and examine the content of those blocks. Therefore, the multi node connector 201 also implements a publish and subscribe mechanism for registration of events to follow. An address of a call-back function is registered to be invoked when an event is triggered. When the event triggers, the multi node connector 201 first makes sure that the events stemming from multiple blockchain node server 107 are not conflicting before passing on the event to the registered call-back address. On top of the aforementioned avoidance of bogus blockchain node server the multi node connector 201 adds robustness and fault-tolerance to the architecture. If e.g. one of the three blockchain node server 107 in the example 200 cannot not be reached, at least two blockchain node server 107 can still provide valid information back to the blockchain communication server and operation can continue uninterrupted.

Diagram 250 in FIG. 7 illustrates one embodiment of the flow of control between the multi node connector 201 and exactly two blockchain node servers 107a and 107b. The principle is the same in the case of multiple blockchain node servers. First, the blockchain communication server 105 invokes the multi node connector through its entry point 251. Then a connection from the multi node connector 201 to both blockchain node servers 1 (107a) and 2 (107b) is established in Steps 252 and 253. The relevant connection information is returned to the multi node connector 201 for further reference and invocation of methods on the blockchain node servers 107. In Step 254, specific data of a block are requested to be retrieved from the blockchain node server 1 (107a). This may be the final state of the block and/or a final account state or multiple blockchain states and blockchain transactions of the block. Blockchain node server 1 (107a) starts the execution and first retrieves the requested block (263), then the requested state (264), and optionally traces execution of all smart contracts (265) involved to get hold of the value transfers and state changes stemming out of these smart contracts. Now the aggregated data from blockchain node server 1 (107a) is returned to the multi node connector 201, which memorizes this block data for further processing in step 255.

In Step 256, the same specific block data are requested to be retrieved from the blockchain node server 2 (107b). Blockchain node server 2 (107b) starts the execution and first retrieves the requested block (268), then the requested state (269), and optionally also traces execution of all smart contracts (270) involved to get hold of the value transfers and state changes stemming out of these smart contracts. Now the aggregated data from blockchain node server 2 (107b) is returned to the multi node connector 201 as well, which memorizes this block & state data for further processing.

Next, a comparison of both received data from blockchain node server 1 (107a), and blockchain node server 2 (107b) is done and only if the received information is identical in its content the data is returned to the blockchain communication server 105. Otherwise, a failure state is raised and communicated to the blockchain communication server, which is then communicated back to the corporate payment server 102 and might display a corresponding error message back to user 101. This may also be delivered via push notification or other immediate and/or asynchronous communication method like email or short message service.

For further understanding of the retrieval of blockchain value transfers performed by the balance and transaction retrieval engine 701 (FIG. 3) and as background, the following paragraphs provide an overview of the principle and structure of the blockchain, as well as of blockchain transactions and smart contracts thereon.

From a technical standpoint, the ledger of a cryptocurrency can be thought of as a state transition system, where there is a "state" consisting of the ownership status of all existing cryptos and a "state transition function" that takes a state and a blockchain transaction and outputs a new state which is the result.

In e.g. Ethereum a blockchain transaction includes the following information:

recipient—the receiving address (if an externally-owned account, the transaction will transfer value. If a contract account, the transaction will execute the contract code)

signature—the identifier of the sender. This is generated when the senders private key signs the transaction and confirms the sender has authorized this transaction value—amount of ETH to transfer from sender to recipient (in WEI, a denomination of ETH)

data—optional field to include arbitrary data gasLimit— the maximum amount of gas units that can be consumed by the transaction. Units of gas represent computational steps maxPriorityFeePerGas—the maximum amount of gas to be included as a fee to the miner.

maxFeePerGas—the maximum amount of gas willing to be paid for the transaction (inclusive of baseFeePerGas and maxPriorityFeePerGas)

Figure 8:
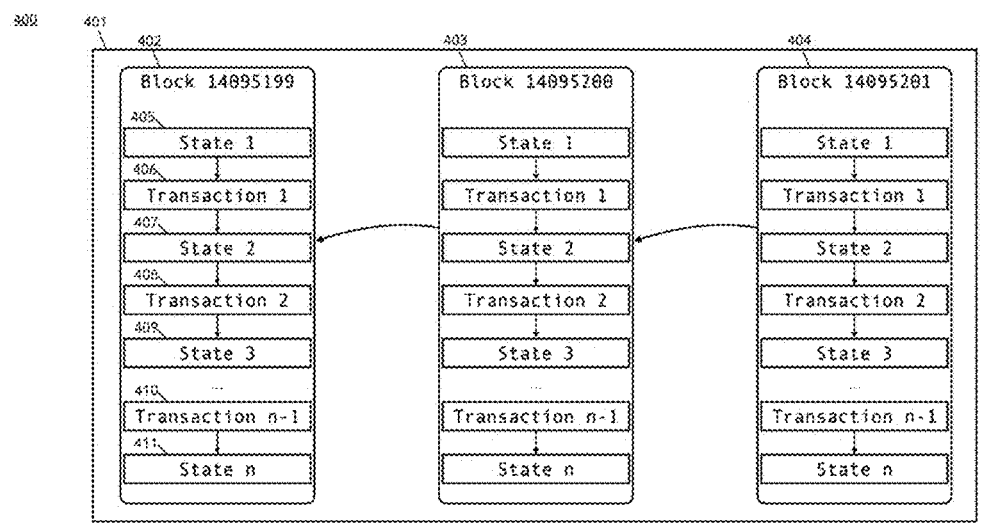
FIG. 8 illustrates the blockchain principle.

Diagram 400 in FIG. 8 depicts a blockchain 401 of three blocks 402, 403, and 404 linked by pointers backward from the most current block 404. The individual blocks contain states and transactions. These are also referred to as blockchain states and blockchain transactions. Block 402 contains a first "State 1" 405 that contains accounts identified by an account address and, among others, their current balance. It is followed by a first transaction 406 that transfers native cryptocurrencies or tokens from one account to another account and thus results in a new "State 2" 407. This state is followed by another transaction 408, resulting in "State 3" 409 and so on until the last transaction 410 in Block 402 is reached that, is followed by the final "State n" 411 of block 402. In practice, only the final "State n" 411 is stored since all previous states can be recreated if needed through the application of the transactions based on the previous blocks' final states. For efficiency reasons, states are typically stored in Merkle or Patricia trees. Since only minimal changes to the global state of all accounts are made with the transactions, the tree is only marginally altered between transactions, and thus storage and efficacy are optimized.

Figure 9:
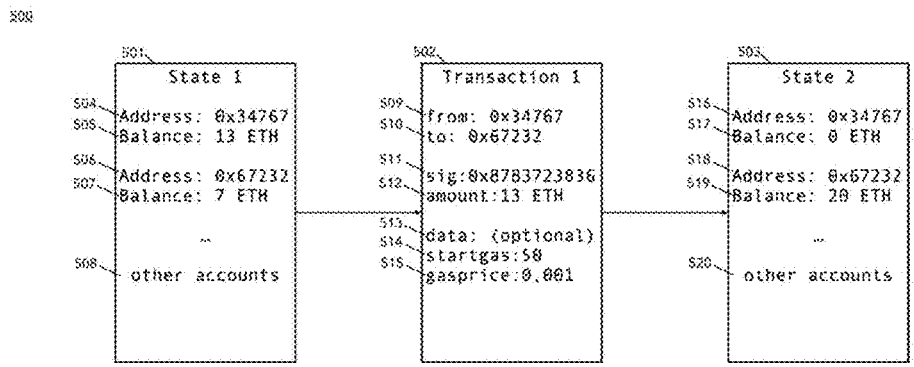
FIG. 9 illustrates a blockchain state transition example.

In the following, an example of state transitioning is illustrated in diagram 500 in FIG. 9, based on a state 1 (501) containing, among others, two fictitious accounts with addresses 504 and 506 and at least the corresponding balances 505 and 507 in the amount of 13 and 7 ETH (in FIG. 8). In the transition from state 1 (501) to state 2 (502), a sample transaction 1 (502) is applied. This transaction (sometimes called message) contains a from-Address 509 and a to-Address 510 to which the funds shall be transferred. To validate the transaction, the sending party needs to provide cryptographic proof of the intention by providing a valid signature 511 with the transaction. This ensures that only users possessing the sender's address wallet can initiate transactions on their accounts. An amount 512, in this case of 13 ETH, shall be transferred to account 510. Optionally a transaction can contain data 513. A startgas 514 and gasprice 515 are included to pay the fees from the transaction to the miners or validators of the transactions. Details of this incentive mechanism to operate blockchain network nodes 107 can be looked up e.g. in the Ethereum Yellow Paper. After executing transaction 502, a new state 2 (503) is reached that shows new balances 517 and 519 on the accounts with the addresses 516 and 518. This is the basic blockchain paradigm serving as the backbone of many decentralized consensus-based transaction systems to date.

Blockchains 401, based on the Ethereum Virtual Machine (EVM), not only allow for the transfer of native cryptocurrencies or tokens from one externally owned account to another but also for the execution of program code that is contained in contract accounts, so-called "Smart Contracts."

Contract accounts can receive messages sent by either external accounts which are owned by real users or another smart contract. The code in smart contracts is written in a stack-based byte code called EVM code defined in the Ethereum Yellow Pages.

To, among other reasons, avoid Distributed Denial of Service (DDoS) attacks, a mechanism for paying for the execution of this byte code (opcode) has also been included. Each opcode can have different costs associated according to the number of computational steps and storage involved in the execution. The underlying computational unit is called "gas" that pays for one computational step. The gas price on the basis of cryptocurrency is multiplied by the number of gas required for the execution of a smart contract and deducted from the sender's account. Actually, a "STARTGAS" is transmitted with each transaction, providing an upper limit for executing a smart contract. Upon the start of the execution of a smart contract, the "STARTGAS" is deducted from the sender's account. Should the contract require more and thus runs out of gas, the execution is stopped. In case of a successful execution of a smart contract, the actual consumed gas is subtracted from the "STARTGAS" and the remaining gas is refunded to the sender. This is an example of a so-called "internal" transaction because the refunding of the gas is not stored as a separate transaction on the blockchain but is part of the execution of the smart contract itself. Smart contracts can also transfer value between accounts (which is the main reason for their existence) which are also not recorded as separate transactions because they are also part of the execution of the smart contract. This leads to certain challenges in the retrieval of all transactions for a valid account statement, as described in detail further below.

Figure 10:
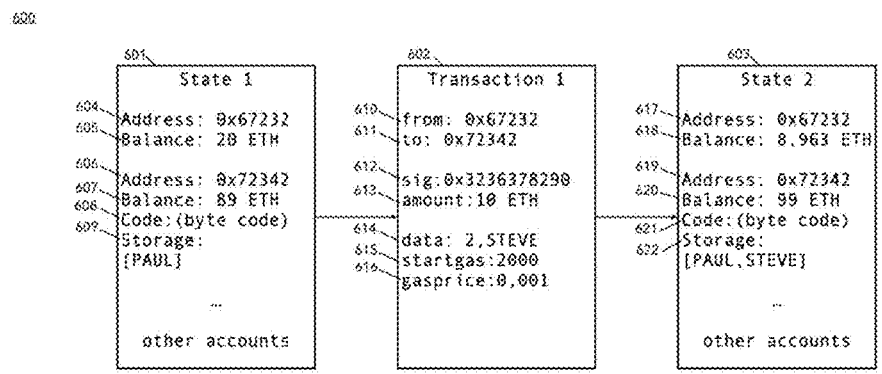
FIG. 10 illustrates a blockchain smart contract state transition example.

A concrete example is provided in diagram 600 of FIG. 10, with an initial state 1 (601) with, among others, two sample accounts with addresses 604 and 606 and their corresponding balances 605 and 607 of 20 ETH and 89 ETH. The second address 606 happens to be a smart contract, denoted by including the code 608, which is a sequence of bytes containing the opcodes of the virtual machine's instructions when triggered by a message. Also, the smart contract contains storage 609, which is used to record information within the blockchain permanently. In this example, it is assumed that it is used to store user names in an array. When transaction 1 (602) initiates the state transition from 601 to 603 it is based on a message from the account with the address 601 and is sent to the smart contract with address 611 which happens to be the address "0x72342" of the smart contract 606. The sender includes again a signature 612 to prohibit manipulation and an amount 613 of 10 ETH. Additionally, the message now includes the data 614: "2, STEVE" which indicates the number 2 as well as the text "STEVE" (encoded as numbers internally as well). Assuming that the smart contract 606 contains code for storing a user's name at a certain position in the array. In this case, it would be array position two, and the name of the user would be "STEVE." Last but not least, the transaction message also contains the startgas of 2000 (615) and the gasprice of 0,001 (616) denoted in the base currency, ETH, in this example. Upon execution, the startgas will be multiplied by the gasprice and deducted from the sender account 611. The startgas will then be stored in memory for tracking the gas usage. This leads to a new balance of the sender's account 618 of 20 ETH−2000*0,001 ETH=18 ETH. Should the sender not have enough funds for this, the transaction will be canceled immediately. Now the amount of 10 ETH (613) is deducted from the sender's account balance 618 and credited to the smart contracts account 620. This leads to a new balance 618 of the sender's account 617 of 8 ETH. Next, the code of the smart contract 608 is executed and checks if position 2 in the storage array is free, then it places the text string "STEVE" into the storage array 622 at position number 2. With every step executed in the smart contract, the gas used for the particular opcode will be deducted from the startgas stored earlier in memory. Should the gas counter reach zero, the smart contract will stop execution, and the transaction will be canceled. If the gas counter does not reach zero, the unused gas will be multiplied by the gasprice and credited to the sender's account address 617. Assuming that the gas required for the execution was 1037 leaving 963 gas remaining. 963 times the gas price of 0,001 ETH results in 0,963 ETH that is refunded to the senders account 618, bringing it to 8,963 ETH. The uninitiated, looking only at the previous state and transaction, might have expected the new account balance to be 8 ETH and would be surprised when the new account balance reaches 8,963 ETH (618) from state 2 (603). Smart contracts are not the only reason that value changes can occur in blockchain-based distributed accounting systems. Mining or validating new blocks also cause value changes for the miner or validator accounts that are not recorded as separate transaction on the blockchain.

Physically all smart contracts are executed on every block chain node server 107 on the blockchain network 106, and the results are subject to the consensus algorithm of the blockchain network 106.

According to one embodiment of the present disclosure, the retrieval of balances and transactions from blockchains is achieved via access to APIs to nodes of the blockchains.

However, with the above-mentioned "internal transactions," which result from the execution of smart contracts of an EVM-based blockchain, these procedures reach their limits because internal transactions of the smart contracts are not stored separately on the blockchain but are part of the state transition 601-602-603. However, a valid account statement has to include all transactions, even internal ones, that are credited or debited to the current account address. The equation s=a+ΣT applies to valid account statements. Where "s" is the closing balance, "a" is the opening balance, and T is the set of relevant transactions "t" and their amount. Thus, the internal transactions of the smart contract executions must also be determined. Since the internal transactions are not recorded on the blockchain itself but only the execution of the smart contracts, the postings for such transactions must be performed by analyzing the before and after status for every opcode executed within the smart contract itself. To do this, the execution of such smart contracts must be traced, and for each execution step of a smart contract's code, the before status must be compared to the after status. Recording the trace results of the status changes yields the individual internal transactions with their amounts, among other entries. For such blockchains, s=a+ΣTe+ΣTi applies, where Te references the external transactions and Ti references the internal transactions.

Such tracing of smart contracts was added as an additionally invokable feature to some implementations of the blockchain node servers 107. In order to create a valid account statement, a special installation of a blockchain node server is needed that is able to trace the execution of the smart contracts and thus deduce the "internal transactions." Complicating matters further, a smart contract can invoke other smart contracts, building more complex interactions. This leads to a situation where many smart contracts might have to be traced to figure out all the value exchanges (internal transactions) that might have taken place during the execution of a single message initiated by a user.

Figure 11:
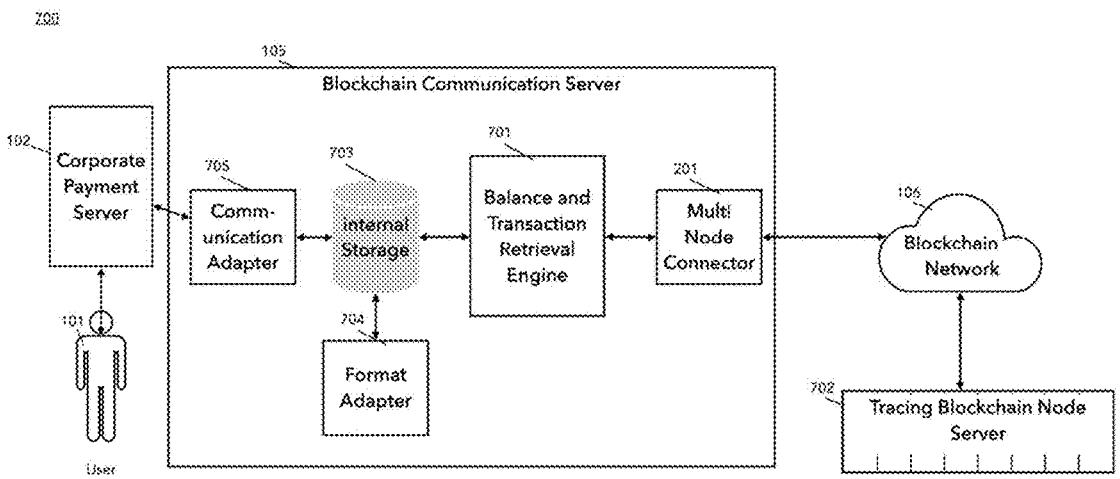
FIG. 11 shows a blockchain communication server according to a further embodiment on which the retrieval of all blockchain value transfers for the creation of valid account statements is explained.

Diagram 700 of FIG. 11 illustrates the system architecture for retrieving balance and transaction information from the blockchains according to one embodiment to create a valid account statement 300 based on the assumptions above.

The blockchain communication server 105 connects to at least two tracing blockchain node servers 702 via the multi node connector 201 and the blockchain network 106. The tracing blockchain node server 702 is a special kind of blockchain node server 107 that has the capabilities to trace the execution of smart contracts to get access to the value transfers incurring from the execution of the smart contracts as in the example 606. The resulting transactions and balances are stored in the internal storage 703 of the blockchain communication server 105 for further processing. The dedicated tracing blockchain node server 702 may need to be provided and operated by the blockchain communication server 105 operator, as these servers are typically not made available on the public blockchain network 106 due to performance penalties associated with tracing. These installations will have to be replicated at least two times to adhere to the requirements of the multi node connector 201. For the operator, an additional benefit is a fault-tolerance architecture created by this tracing blockchain node servers 702. Should one of the tracing blockchain node servers 702 fail, the others are still operating, and the blockchain communication server 105 can still operate. To fully keep the multi node principle working, at least three tracing blockchain node servers are required since at least two are required for comparing the data retrieved from the blockchain node servers.

When the surrounding environment (as outlined in the context of the flow charts of FIG. 4 or FIG. 5) triggers the retrieval of blockchain transactions and balances for specific accounts and date ranges, the balance and transaction retrieval engine 701 iterates through the list of required accounts and instructs the multi node connector 201 to connect subsequently to at least two tracing blockchain servers 702 through the blockchain network 106. The tracing blockchain servers will be accessed via their published APIs to retrieve plain transactions like in the example 500. For each account address, the state 501 at the start date is first accessed to retrieve the balances 505, 507, etc. To get to the relevant block e.g. 402 and find the relevant transactions starting with e.g. 408 within the block, the block is first identified by its timestamp, which must be greater than or equal to the start date range and less than or equal to the end of the date range. The transactions from the blocks, that have the current account as sender or receiver are recorded in the internal storage 703. The opening balance is retrieved from the previous blocks final account state and stored in the internal storage 703 for further processing. The closing balance for the account statement is retrieved from the final account state from the last matching Block for the date range and is also stored in the internal storage 703.

For smart contract transactions, the opening balance is retrieved and stored as for the plain transactions described above. The transaction amount from the smart contract invocation is also stored as before. Now, the value transfers for the smart contract are extracted step-by-step for each opcode from the tracing blockchain server 702. Each and every value transfer that pertains to the senders account is retrieved and also stored in the internal Storage 703. The closing balance is retrieved as with plain transactions above.

Now that an opening balance 304 and transactions 305, and a closing balance 306 are stored in the internal storage 703, the information can be passed on to the required format adapter 704 for the target statement formats. The communication adapter 705 builds messages according to the classic EBICS, FTPs, or other electronic banking protocols and passes those messages on to the corporate payment server 102 for users 101 utilizing the electronic banking communication network 103.

The invention claimed is:

1. A method of generating an account statement for a user from blockchain data, the method comprising the following steps:

setting up, by one or more processors of a communication server, a connection between the communication server and a blockchain network;

implementing a publish and subscribe mechanism for registration of new block events, wherein an address of a call-back function is registered to be invoked when a new block event is triggered by a blockchain node server of the blockchain network;

verifying that new block events from at least a first arbitrary blockchain node server and a second arbitrary blockchain node server are not conflicting and upon verification invoking the call-back function:

upon invoking the call-back function, retrieving, by the one or more processors, data associated with an account address of the user from the new block most recently generated on the blockchain network, including a final account state, wherein the final account state comprises a final account balance of the block corresponding to the account address of the user;

determining, by the one or more processors, whether the final account state of the block differs from an account state of the user that was last stored in a memory accessible by the communication server, and if a difference is determined:

storing, by the one or more processors, the final account state as account state of the user in the memory;

retrieving, by the one or more processors, further data associated with the account address of the user from the block including blockchain transactions;

deriving, by the one or more processors, a closing balance from the final account balance comprising converting the closing balance into an account statement format;

converting, by the one or more processors, information in the blockchain transactions into transaction data, wherein the transaction data have the account statement format;

generating, by the one or more processors, for the account address, a current account statement comprising the closing balance and the transaction data;

transforming the current account statement into another account statement format, wherein the another account statement format is a format according to the ISO 20022 standard including camt.052 and camt.053 or a SWIFT MT format including MT940 and MT 942, and wherein the format corresponds to an account statement format used by a corporate payment server for processing; and sending a message comprising the transformed account statement to the corporate payment server via a communication network, which holds the transformed account statement available for the user, wherein the data or the further data are retrieved from the blockchain network by performing the steps of:

connecting to the at least first arbitrary blockchain node server and second arbitrary blockchain node server in the blockchain network;

retrieving first data of the block from the first arbitrary blockchain node server and second data of the block from the second arbitrary blockchain node server, wherein the first and second data each comprise the final account state or the blockchain transactions of the block on the respective blockchain node server; and checking whether the first data and the second data are identical, and if identical continuing with further processing of the data and/or the further data, and if not identical raising an error condition.

2. The method of claim 1, wherein each transaction of the blockchain transactions comprises the account address, a transaction amount and a target account address to which the transaction amount is transmitted; and wherein the current account statement further comprises an opening balance that is equal to a last stored account balance of the last stored account state.

3. The method of claim 1, wherein the blockchain is based on an Ethereum Virtual Machine, EVM, and the method further comprises the step of:

determining, by the one or more processors, internal transactions from smart contract executions, by tracing executions of the smart contract on the blockchain network and for each execution of a smart contract opcode comparing a before status with an after status.

4. The method of claim 1, wherein the at least first and second blockchain node servers are tracing blockchain node servers on the blockchain network.

5. The method of claim 3, wherein the internal transactions are determined by performing the following steps:

determining, by the one or more processors, first internal transactions from the smart contract executions, by tracing the executions of the smart contract on a first tracing blockchain node server;

determining, by the one or more processors, second internal transactions from the smart contract executions, by tracing the executions of the smart contract on a second tracing blockchain node server; and checking, by the one or more processors, whether the first internal transactions and the second internal transactions are identical, and if identical continuing with further processing of the internal transactions, and if not identical raising an error condition.

6. The method of claim 3, wherein the transaction data includes the internal transactions.

7. The method of claim 1, wherein the account statement is generated for a specified time range.

8. The method of claim 1, wherein the account state is a state of the block corresponding to the account address of the user.

9. The method of claim 1, wherein converting the closing balance into the account statement format includes rounding, by the one or more processors, the final account balance to 5 decimal places and cutting to 18 numeric characters.

10. A communication server for generating account statements from blockchain data, the communication server is configured to:

set up a connection between the communication server and a blockchain network;

implementing a publish and subscribe mechanism for registration of new block events, wherein an address of a call-back function is registered to be invoked when a new block event is triggered by a blockchain node server of the blockchain network;

verifying that new block events from at least a first arbitrary blockchain node server and a second arbitrary blockchain node server are not conflicting and upon verification invoking the call-back function:

upon invoking the call-back function, retrieve data associated with an account address of the user from the new block most recently generated on the blockchain network, including a final account state, wherein the final account state comprises a final account balance of the block corresponding to the account address of the user;

determine whether the final account state of the block differs from an account state of the user that was last stored in a memory accessible by the communication server, and if a difference is determined:

store the final account state as account state of the user in the memory;

retrieve further data associated with the account address of the user from the block including blockchain transactions;

derive a closing balance from the final account balance comprising converting the closing balance into an account statement format;

convert information in the blockchain transactions into transaction data, wherein the transaction data have the account statement format;

generate, for the account address, a current account statement comprising the closing balance and the transaction data;

transform the current account statement into another account statement format, wherein the another account statement format is a format according to the ISO 20022 standard including camt.052 and camt.053 or a SWIFT MT format including MT940 and MT 942, and wherein the format corresponds to an account statement format used by a corporate payment server for processing; and sending a message comprising the transformed account statement to the corporate payment server via a communication network, which holds the transformed account statement available for the user, wherein the data or the further data are retrieved from the blockchain network by performing the steps of:

connecting to the at least first arbitrary blockchain node server and second arbitrary blockchain node server in the blockchain network;

retrieving first data of the block from the first arbitrary blockchain node server and second data of the block from the second arbitrary blockchain node server, wherein the first and second data each comprise the final account state or the blockchain transactions of the block on the respective blockchain node server; and checking whether the first data and the second data are identical, and if identical continuing with further processing of the data and/or the further data, and if not identical raising an error condition.

11. The communication server of claim 10, wherein the communication server to retrieve the data and/or the further data from the blockchain network is further configured to:

connect to at least a first blockchain node server and a second blockchain node server in the blockchain network;

retrieve first data of the block from the first blockchain node server and second data of the block from the second blockchain node server, wherein the first and second data each comprise the final account state and/or the blockchain transactions of the block on the respective blockchain node server; and check whether the first data and the second data are identical, and if identical continuing with further processing of the data and/or the further data, and if not identical raising an error condition.

12. The communication server of claim 10, wherein the blockchain is based on an Ethereum Virtual Machine, EVM, and the communication server is further configured to:

determine internal transactions from smart contract executions, by tracing executions of the smart contract on the blockchain network and for each execution of a smart contract opcode comparing a before status with an after status.

13. A non-transitory computer readable storage medium storing instructions that, when executed by one or more processors, cause the one or more processors to perform a method, comprising:

setting up a connection between the communication server and a blockchain network;

implementing a publish and subscribe mechanism for registration of new block events, wherein an address of a call-back function is registered to be invoked when a new block event is triggered by a blockchain node server of the blockchain network;

verifying that new block events from at least a first arbitrary blockchain node server and a second arbitrary blockchain node server are not conflicting and upon verification invoking the call-back function:

upon invoking the call-back function, retrieving data associated with an account address of the user from the new block most recently generated on the blockchain network, including a final account state, wherein the final account state comprises a final account balance of the block corresponding to the account address of the user;

determining whether the final account state of the block differs from an account state of the user that was last stored in a memory accessible by the communication server, and if a difference is determined:

storing the final account state as account state of the user in the memory;

retrieving further data associated with the account address of the user from the block including blockchain transactions;

deriving a closing balance from the final account balance comprising converting the closing balance into an account statement format;

converting information in the blockchain transactions into transaction data, wherein the transaction data have the account statement format;

generating for the account address, a current account statement comprising the closing balance and the transaction data;

transforming the current account statement into another account statement format, wherein the another account statement format is a format according to the ISO 20022 standard including camt.052 and camt.053 or a SWIFT MT format including MT94O and MT 942, and wherein the format corresponds to an account statement format used by a corporate payment server for processing; and sending a message comprising the transformed account statement to the corporate payment server via a communication network, which holds the transformed account statement available for the user, wherein the data or the further data are retrieved from the blockchain network by performing the steps of:

connecting to the at least first arbitrary blockchain node server and second arbitrary blockchain node server in the blockchain network;

retrieving first data of the block from the first arbitrary blockchain node server and second data of the block from the second arbitrary blockchain node server, wherein the first and second data each comprise the final account state or the blockchain transactions of the block on the respective blockchain node server; and checking whether the first data and the second data are identical, and if identical continuing with further processing of the data and/or the further data, and if not identical raising an error condition.

14. The non-transitory computer readable storage medium of claim 13, which, for retrieving the data and/or the further data from the blockchain network, stores further instructions that, when executed by the one or more processors, cause the one or more processors to perform further method steps, comprising:

connecting to at least a first blockchain node server and a second blockchain node server in the blockchain network;

retrieving first data of the block from the first blockchain node server and second data of the block from the second blockchain node server, wherein the first and second data each comprise the final account state and/or the blockchain transactions of the block on the respective blockchain node server; and checking whether the first data and the second data are identical, and if identical continuing with further processing of the data and/or the further data, and if not identical raising an error condition.

15. The non-transitory computer readable storage medium of claim 13, wherein the blockchain is based on an Ethereum Virtual Machine, EVM, and the non-transitory computer readable storage medium stores further instructions that, when executed by the one or more processors, cause the one or more processors to perform a further method step, comprising:

determine internal transactions from smart contract executions, by tracing executions of the smart contract on the blockchain network and for each execution of a smart contract opcode comparing a before status with an after status.

\* \* \* \* \*